Sept. 11, 1928.
MELCHOR CENTENO V.
SAFETY APPLIANCE FOR TOOLS
Filed June 13, 1925
1,684,345
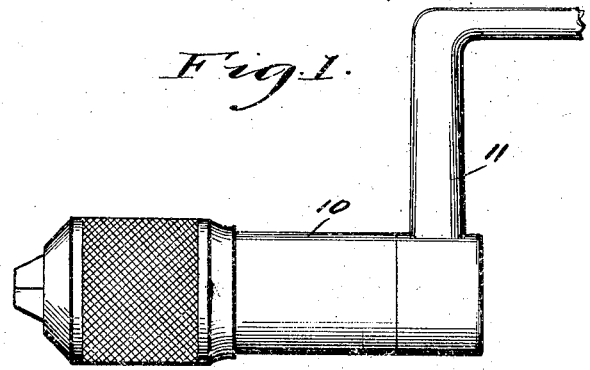
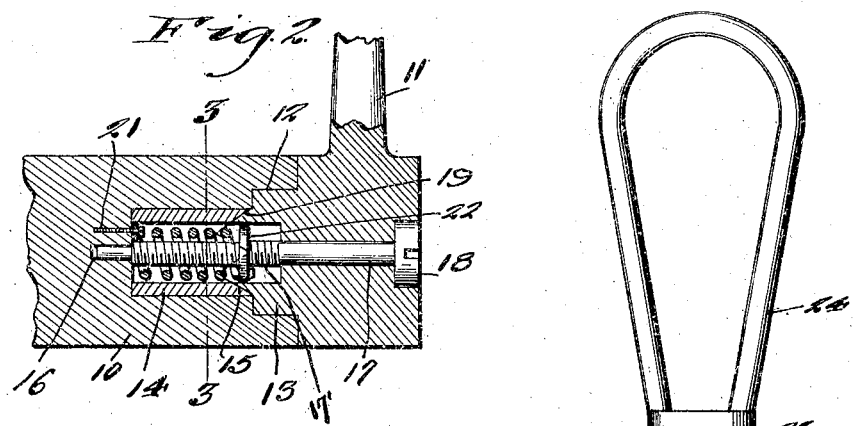
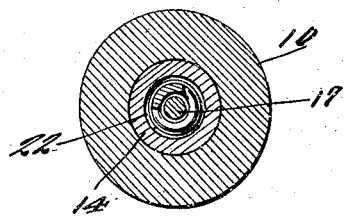
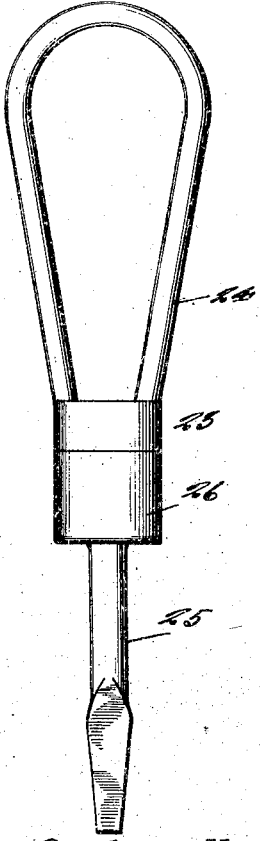
Melchor Centeno V INVENTOR Patented Sept. 11, 1928.

1,684,345

UNITED STATES PATENT OFFICE.

MELCHOR CENTENO V., OF CHICAGO, ILLINOIS.

SAFETY APPLIANCE FOR TOOLS.

Application filed June 13, 1925. Serial No. 36,894.

This invention relates to improvements in safety appliances for tools.

The principal object of the invention is to embody in a tool such as a screw driver, brace, or other like tool to which a turning movement is adapted to be imparted, a means which will render the tool inoperative when the torsional strain imparted thereto is of a greater force than the tool is capable of receiving. Therefore instead of damaging the tool, the same is rendered temporarily inoperative.

Another object resides in a device of the class above mentioned, which includes a pair of clutch parts normally held in a clutching position by a tension means for rotation as a single unit, and a means for adjusting said tension means for controlling the degree of tension between the parts whereby the parts may be set to withstand a predetermined amount of torsional strain without disengaging.

With these and other objects in view, the invention resides in certain novel construction and combination and arrangement of parts, the essential features of which are hereinafter fully described, are particularly pointed out in the appended claim, and are illustrated in the accompanying drawing in which:—

Figure 1 is a detail side elevation of a portion of the brace with my invention embodied therein.

Figure 2 is a vertical longitudinal sectional view therethrough.

Figure 3 is a transverse sectional view on the line 3—3 of Figure 2.

Figure 4 is an elevational view of a screw driver with my invention embodied therein.

Referring more particularly to the drawing, the reference numeral 10 designates a shank of a brace or other like implement adapted to be rotated, and 11 as a manipulating part for imparting rotary movement to the part 10. Heretofore, these parts have been formed integral, but in my invention I provide a slip clutch between the parts for limiting the torsional strain upon the tool thereby rendering the tool inoperative rather than damaging the same. The part 10 has its end formed with a bearing 12 for receiving a reduced portion 13 on the part 11, and which part 10 is received to receive a clutch sleeve 14 rearward of the bearing 12. This sleeve may be sweated into the recess provided therefor, or the V-shaped clutch teeth 15 may be formed directly in the part 10. The reduced recess 16 is provided axially in the part 10 beyond the sleeve and serves as a bearing for slidably receiving one end of a shaft 17, which has its other end journalled in the part 11, and is provided with a manipulating head 18 counter-sunk in said last named part. A portion of the shaft 17 is screw threaded as at 17' for a purpose to be presently explained.

The reduced portion 13 of the part 11 is provided with V-shaped clutch teeth 19 which are normally held in co-acting position with the teeth 15 of the part 10 by a tension means which comprises a contractile spring which encircles a portion of the screw and has one of its ends secured as at 21 to the rear wall of the recess which receives the sleeve 14 while the other end of the spring is secured to a movable plate 22 which co-acts with the threads 17' on a portion of the shaft.

From the foregoing description, it will be noted that the tendency of the spring is to hold the teeth 15 and 19 of the respective parts in co-acting position so that both parts will rotate simultaneously when turning movement is applied to the manipulating part 11. We shall presume that the tool is in engagement with a piece of work which requires greater turning force to be applied to the manipulating part than the tension of the spring is capable of withstanding. If such is the case, then the pressure imparted to the part 11 overcomes the tension of the spring at which time the teeth will slip or disengage thereby rendering the part 10 inoperative. The tension of the spring may be adjusted by rotating the head 18 of the shaft which slides the plate 22 in a longitudinal direction. The tension maintained will be of course determined by the strength of the tool or by the work to be operated on by the tool. The head 18 serves to prevent the part 11 from sliding off the end of the shaft should the ratchet teeth slip during the turning of the part 11 with respect to the part 10.

In Figure 4, I have shown a modified form of my invention in the nature of a screw driver 23 which includes a manipulating part 24 and a shank 25 having an enlarged head 26 which houses the clutch parts. The construction and operation of this particular tool is identical with that of the preferred form.

What is claimed as new is:—

In a tool, the combination of a pair of rotatable parts, one of said parts having a recess therein, co-acting teeth on said parts, a shaft freely extending through one of said parts and journalled in the other of said parts, a head provided on the outer end of said shaft and counter-sunk in said first mentioned part, said head having a kerf therein, screw threads provided on said shaft for a portion of its length, a collar co-acting with said screw threads and disposed within said recess, and a contractile spring encircling said shaft, one end of said spring being fixed to the end wall of said recess and the other end fixed to said collar whereby rotation of said shaft will cause said collar to be adjusted longitudinally thereon to regulate the tension of said spring to hold the co-acting teeth in engagement against a predetermined turning force when applied to either of said parts.

In testimony whereof I have affixed my signature.

MELCHOR CENTENO V.